US012670932B2

(12) United States Patent
Xu et al.

(10) Patent No.: US 12,670,932 B2
(45) Date of Patent: Jun. 30, 2026

(54) IMAGE PROCESSING METHOD, APPARATUS, DEVICE AND STORAGE MEDIUM

(71) Applicant: Beijing Zitiao Network Technology Co., Ltd., Beijing (CN)

(72) Inventors: Panpan Xu, Beijing (CN); Miao Hua, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/569,838

(22) PCT Filed: May 9, 2022

(86) PCT No.: PCT/CN2022/091746
§ 371 (c)(1),
(2) Date: Dec. 13, 2023

(87) PCT Pub. No.: WO2022/262473
PCT Pub. Date: Dec. 22, 2022

(65) Prior Publication Data
US 2024/0135972 A1 Apr. 25, 2024
US 2024/0233771 A9 Jul. 11, 2024

(30) Foreign Application Priority Data
Jun. 16, 2021 (CN) .......................... 202110668031.4

(51) Int. Cl.
*G11B 27/031* (2006.01)
*G06V 10/774* (2022.01)
*G06V 40/16* (2022.01)

(52) U.S. Cl.
CPC .......... *G11B 27/031* (2013.01); *G06V 10/774* (2022.01); *G06V 40/171* (2022.01); *G06V 40/176* (2022.01)

(58) Field of Classification Search
CPC .. G11B 27/031; G06V 40/171; G06V 40/176; G06V 10/774
See application file for complete search history.

(56) References Cited

U.S. PATENT DOCUMENTS 11,544,887 B2 * 1/2023 Zhou .................... G06V 40/176
2013/0235045 A1 * 9/2013 Corazza .............. G06V 40/172
                                                345/473
(Continued)

FOREIGN PATENT DOCUMENTS

CN      108197533 A      6/2018
CN      110941992 A      3/2020
(Continued)

OTHER PUBLICATIONS

W. Wang, X. Alameda-Pineda, D. Xu, E. Ricci and N. Sebe, "Learning How to Smile: Expression Video Generation With Conditional Adversarial Recurrent Nets," in IEEE Transactions on Multimedia, vol. 22, No. 11, pp. 2808-2819, Nov. 2020, doi: 10.1109/TMM.2019.2963621. (Year: 2020).*
(Continued)

*Primary Examiner* — Gelek W Topgyal
(74) *Attorney, Agent, or Firm* — Alleman Hall LLP

(57) ABSTRACT

This disclosure relates to an image processing method, an image processing apparatus, a device, and a storage medium, wherein after acquiring an expression image, an expression in the expression image can be adjusted based on a preset image processing model to generate a video with a change process of the expression, and the video is displayed to the user.

12 Claims, 5 Drawing Sheets

Acquire an expression image — S101

Adjust an expression in the expression image based on a preset image processing model to generate a video with a change process of the expression — S102

Display the video — S103

(56) References Cited

U.S. PATENT DOCUMENTS

| | | | | |
|---|---|---|---|---|
| 2018/0068178 A1* | 3/2018 | Theobalt | ................ | G06T 13/40 |
| 2018/0173942 A1* | 6/2018 | Kim | ........................ | G06T 13/40 |
| 2019/0205625 A1* | 7/2019 | Luo | ................ | G06V 30/19173 |
| 2020/0118269 A1 | 4/2020 | Alsan et al. | | |
| 2021/0133483 A1* | 5/2021 | Prabhu | ................ | G06V 10/454 |
| 2021/0306557 A1* | 9/2021 | Voss | .................... | H04N 23/632 |

FOREIGN PATENT DOCUMENTS

| | | | |
|---|---|---|---|
| CN | 111274447 A | 6/2020 |
| CN | 111383307 A | 7/2020 |
| CN | 111401101 A | 7/2020 |
| CN | 111432233 A | 7/2020 |
| CN | 111553267 A | 8/2020 |
| CN | 113409208 A | 9/2021 |

OTHER PUBLICATIONS

ISA China National Intellectual Property Administration, Written Opinion for International Application No. PCT/CN2022/091746, mailed Jul. 18, 2022, 11 Pages.

China National Intellectual Property Administration, Office Action and Search Report Issued in Application No. 202110668031.4, Jan. 20, 2023, 8 pages.

China National Intellectual Property Administration, Office Action Issued in Application No. 202110668031.4, May 11, 2023, 5 pages.

Fan, L. et al., "Controllable Image-to-Video Translation: A Case Study on Facial Expression Generation," Proceedings of the Thirty-Third AAAI Conference on Artificial Intelligence (AAAI-19), Jan. 27, 2019, Honolulu, HI, 10 pages.

ISA China National Intellectual Property Administration, International Search Report Issued in Application No. PCT/CN2022/091746, Jul. 18, 2022, WIPO, 4 pages.

* cited by examiner

IMAGE PROCESSING METHOD, APPARATUS, DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/CN2022/091746, filed on May 9, 2022, which is based on and claims priority of Chinese application for invention No. 202110668031.4, filed on Jun. 16, 2021, the disclosure of which is hereby incorporated into this disclosure by reference in its entirety.

TECHNICAL FIELD

The embodiments of the disclosure relate to the technical field of image processing, in particular to an image processing method, an image processing apparatus, a device, and a storage medium.

BACKGROUND

In the related art, users can record their lives through videos, photos and the like, and upload them to video applications for other video consumers to watch. However, with the development of video applications, simple video or picture sharing has been unable to meet the growing needs of users.

SUMMARY

A first aspect of the present disclosure provides an image processing method, comprising:

acquiring an expression image;

adjusting an expression in the expression image based on a preset image processing model to generate a video with a change process of the expression; and displaying the video.

Optionally, the adjusting an expression in the expression image based on a preset image processing model to generate a video with a change process of the expression comprises:

adjusting at least one of a smile degree or an eye opening or closing degree in the expression image based on the preset image processing model to generate a video with a change process of at least one of the smile degree or the eye opening or closing degree.

Optionally, the image processing model is trained based on an expression image of a sample object and a video of a change of an expression of the sample object.

Optionally, the video of the change of the expression of the sample object is acquired by migrating a change process of the expression in a preset video to the expression image of the sample object by using a preset migration model.

Optionally, the migration model is trained based on images of a plurality of facial regions and expression differences between the images of the plurality of facial regions, wherein the images of the plurality of facial regions are images of a same type of expression, and expression degrees of the same type of expression in different images are different.

Optionally, the images of the plurality of facial regions are extracted based on key points of face in a preset facial image.

A second aspect of the present disclosure provides an image processing apparatus, comprising:

an expression image acquisition unit for acquiring an expression image;

a video generation unit for adjusting an expression in the expression image based on a preset image processing model to generate a video with a change process of the expression;

a video display unit for displaying the video.

Optionally, the video generation unit is for adjusting at least one of a smile degree or an eye opening or closing degree in the expression image based on the preset image processing model to generate a video with a change process of at least one of the smile degree or the eye opening or closing degree.

Optionally, the image processing model is trained based on an expression image of a sample object and a video of a change of an expression of the sample object.

Optionally, the video of the change of the expression of the sample object is acquired by migrating a change process of the expression in a preset video to the expression image of the sample object by using a preset migration model.

Optionally, the migration model is trained based on images of a plurality of facial regions and expression differences between the images of the plurality of facial regions, wherein the images of the plurality of facial regions are images of a same type of expression, and expression degrees of the same type of expression in different images are different.

Optionally, the images of the plurality of facial regions are extracted based on key points of face in a preset facial image.

A third aspect of the present disclosure provides a terminal device, comprising:

a memory; and a processor coupled to the memory, the processor configured to perform the image processing method as described above based on instructions stored in the memory.

A fourth aspect of the present disclosure provides a non-transitory computer-readable storage medium having stored therein a computer program which, when executed by a processor, implements the image processing method as described above.

A fifth aspect of the present disclosure provides a computer program comprising: instructions which, when executed by a processor, cause the processor to perform the image processing method as described above.

A sixth aspect of the present disclosure provides a non-transitory computer program product comprising instructions which, when executed by a processor, cause the processor to perform the image processing method as described above.

BRIEF DESCRIPTION OF THE DRAWINGS

The drawings, which are incorporated in and constitute a part of this description, illustrate embodiments consistent with the present disclosure and, and together with the description, serve to explain the principles of the present disclosure.

In order to more clearly illustrate the technical solutions in the embodiments of the present disclosure or the prior art, a brief introduction will be given below for the drawings required to be used in the description of the embodiments or the prior art. It is obvious that, for an ordinary skilled in the art, he or she may also acquire other drawings according to such drawings without paying inventive efforts.

DETAILED DESCRIPTION

In order that the above objects, features and advantages of the present disclosure may be more clearly understood, the scheme of the present disclosure will be further described below. It is to be noted that, without conflict, the embodiments and the features in the embodiments of the present disclosure can be combined with each other.

In the following description, numerous specific details are set forth in order to provide a thorough understanding of the present disclosure, but the present disclosure may be practiced otherwise than as described herein; obviously, the embodiments disclosed in the specification are only a portion of the embodiments of the present disclosure, and not all embodiments.

How to process a video or an image and improve the interestingness of the video or the image is a technical problem which needs to be solved urgently at present. In order to solve the technical problem or at least partially solve the technical problem, embodiments of the present disclosure provide an image processing method, an image processing apparatus, a device, and a storage medium.

Figure 1:
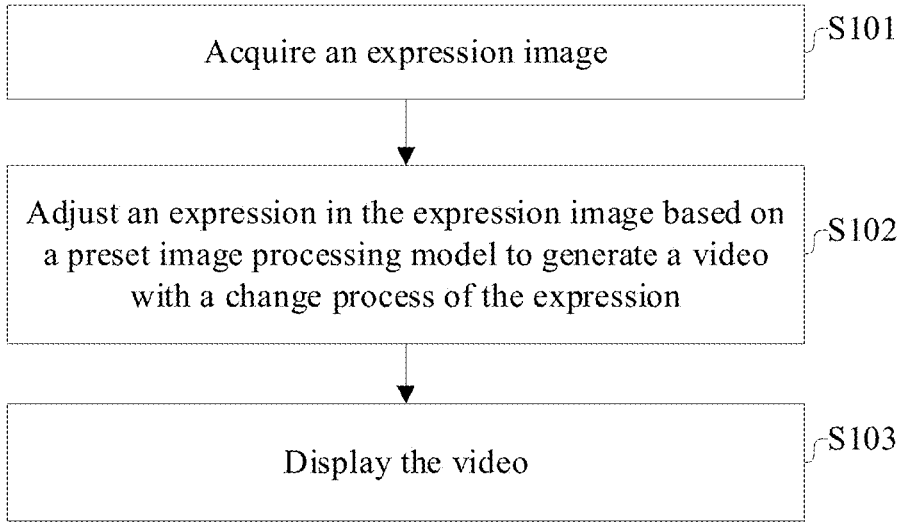
FIG. 1 is a flow diagram of an image processing method provided by an embodiment of the present disclosure.

FIG. 1 is a flow diagram of an image processing method provided by an embodiment of the present disclosure, which may be executed by a terminal device having an image processing capability. In practical applications, the terminal device may be at least a mobile phone, a tablet computer, a desktop computer, an all-in-one machine, and other terminal devices, but is not limited to these devices listed here.

As shown in FIG. 1, an image processing method provided by an embodiment of the present disclosure comprises steps S101 to S103.

Step S101: acquiring an expression image.

An expression image may be understood as an image of an object containing a certain expression. The expression of the object may be, for example, smiling, serious, crying, sad, etc. but not limited to this. The expression of the object may be presented by a shape of facial organs of the object, which may comprise eyes, nose, mouth, eyebrows, etc. of the object.

In the embodiment of the present disclosure, the expression image may be understood as an expression image of a real person or an animal, or may also be understood as an expression image of a cartoon person or a cartoon animal, but the expression image in this embodiment is not limited thereto, and in fact, the expression image referred to in the embodiment may be an expression image of an arbitrary object having an expression.

In the embodiment of the present disclosure, the expression image to be processed can be acquired in a preset mode. The preset mode can comprise shooting, downloading, drawing or extracting. It should be noted that the preset mode is not limited to the aforementioned shooting, downloading, drawing, or extracting mode.

The shooting mode refers to shooting an object using a shooting device configured by a terminal device to acquire the expression image of the object.

The downloading mode refers to searching and downloading the expression image from a remote database.

The drawing mode refers to drawing a facial image comprising a certain expression by using a drawing tool, and using the drawn facial image as the expression image referred to in this embodiment, where the facial image may be a realistic facial image or a cartoon facial image.

The extraction mode refers to extracting a frame image containing a certain expression from a video as the expression image referred to in this embodiment.

In some embodiments of the present disclosure, in a case where a frame (image) is extracted from a video as the expression image, and the foregoing operation is automatically performed by a terminal device, the terminal device needs to determine whether the frame comprises a certain expression of the object. In this case, the terminal device may deploy a facial recognition model to identify whether the frame in the video has a certain expression using the facial recognition model, and then determine whether to extract the frame as the expression image. The aforementioned facial recognition model can be obtained by training facial images of a large number of objects, and in practical application, the facial recognition model can be a deep learning model with various known architectures.

In other embodiments, a certain frame in the video may also be selected by the user as the expression image referred to in this embodiment. At this time, the terminal extracts the designated image as the expression image according to the operation performed by the user.

Step S102: adjusting an expression in the expression image based on a preset image processing model to generate a video with a change process of the expression.

The preset image processing model is a model which is specially used for adjusting features of facial organs in the expression image and realizing changes of facial expression by changing the features of the facial organs so as to obtain a video with specific expression change.

In the embodiment of the present disclosure, after the expression image is input into the preset image processing model, the preset image processing model adjusts pixels of an image area where at least one facial organ in the expression image is located, so as to obtain a plurality of adjusted expression images, where at least one of shapes and positions of a certain facial organ in the adjusted expression images are different.

For example, in an embodiment, a smile degree of the mouth in the expression image may be adjusted based on the preset image processing model to generate expression images with different smile degrees; in another embodiment, an eye opening or closing degree in the expression image can be adjusted based on the preset image processing model to generate expression images with different eye opening or closing degrees; in yet another embodiment, eyebrow features of the expression image can be adjusted based on the preset image processing model to generate expression images with different eyebrow features; in still another embodiment, nose features in the expression image can be adjusted based on the preset image processing model to generate expression images with different nose features.

Of course, the above description is only an example, and it is not the only limitation to the expression adjustment object and mode. In fact, the expression adjustment object and mode may be set as required without being limited to a specific object or a specific mode. For example, in some embodiments, at least some of the above modes may be combined to obtain expression images with a change process of expressions of combined representation of facial organs, for example, the smile degree of the mouth and the eye opening or closing degree in the expression image may be adjusted at the same time to generate the expression images with changes in both the smile degree and the eye opening or closing degree.

In the embodiment of the present disclosure, after the adjusted images are generated, the generated expression images may be sequentially sorted based on an order of expression amplitude from small to large, or from large to small, so as to generate a video with a specific frame frequency.

Figure 2:
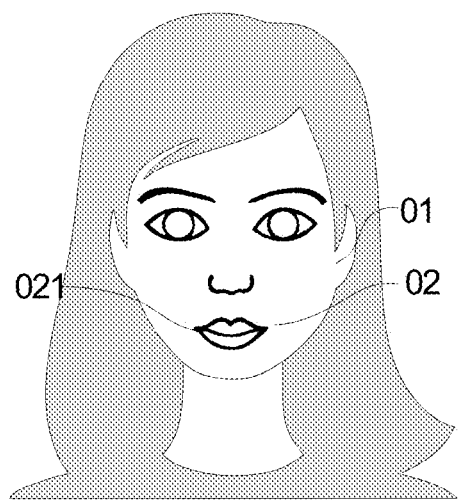
FIG. 2 is a schematic diagram of an expression image provided by an embodiment of the present disclosure.
Figure 3:
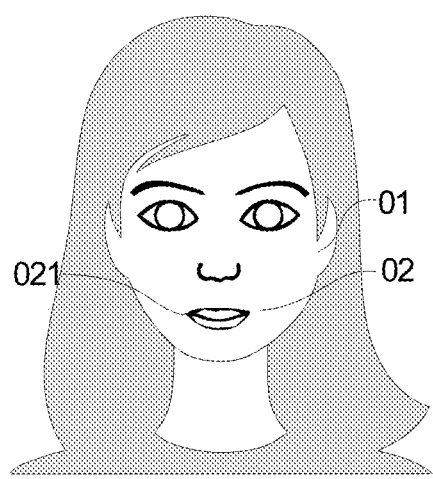
FIG. 3 is a schematic diagram of an adjusted expression image generated based on FIG. 2.
Figure 4:
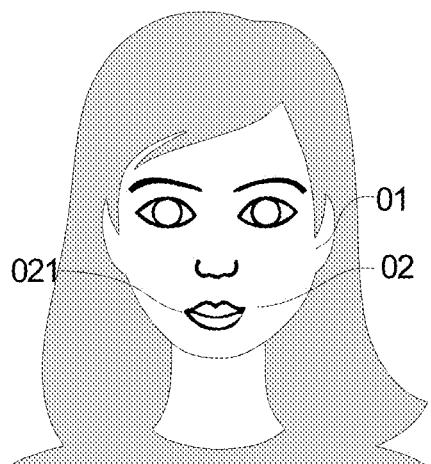
FIG. 4 is a schematic diagram of another adjusted expression image generated based on FIG. 2.
Figure 5:
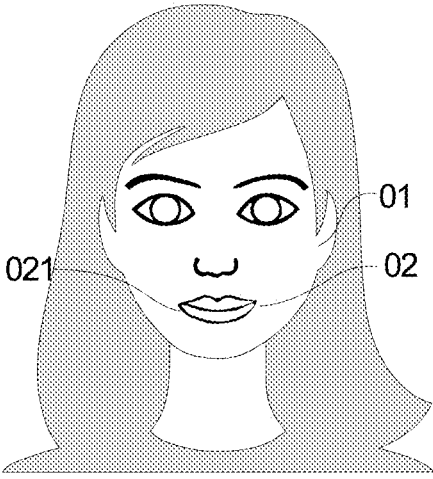
FIG. 5 is a schematic diagram of still another adjusted expression image generated based on FIG. 2.

FIG. 2 is a schematic diagram of an expression image provided by an embodiment of the present disclosure; FIG. 3 is a schematic diagram of an adjusted expression image generated based on FIG. 2; FIG. 4 is a schematic diagram of another adjusted expression image generated based on FIG. 2; FIG. 5 is a schematic diagram of still another adjusted expression image generated based on FIG. 2.

With reference to FIG. 2 to FIG. 5, it can be seen that in an embodiment of the present disclosure, in step S102, adjusting the expression in the expression image based on the preset image processing model is to adjust the shape of mouth 02 of object 01, specifically to adjust the upturned position of mouth corner 021 of the object, so as to obtain a plurality of adjusted images with different change features of the mouth corner 021; subsequently, in step S102, the three adjusted images are combined according to the sorting order of FIG. 3 to FIG. 5 to obtain a video of the change of the mouth corner 021, so as to represent the change of the object's smile degree by using the video of the change of the mouth corner.

It should be noted that, this is merely an example, not the only limitation. In fact, in other embodiments, the generated plurality of expression images may also comprise different expressions, in which case, the plurality of expression images may be sorted according to a specific expression change sequence to generate a video with a change process of a specific expression, for example, a serious expression image and a sad expression image are generated based on a smile expression image, and then the expression images can be arranged in the order of smiling first, then being serious, and finally being sad, so as to generate a video with a change process from smiling to being sad.

Step S103: displaying the video.

After the video with the change process of the expression is generated, the video can be displayed by a display device. For example, when the terminal device referred to in this embodiment is specifically a smartphone, the smartphone performs the foregoing steps S101 and S102, and displays the video obtained based on the steps S101 and S102 on a display screen.

By adopting the image processing method provided by the embodiment of the present disclosure, after the expression image is acquired, the video with the change process of the expression can be generated according to the expression image. The methods in the aforementioned steps S101 to S103 may be integrated into a specific application program or software tool. By installing the application program or software tool on the terminal device, the terminal device can generate the video with the change in expression features based on the certain expression image, thus improving the interest of the video and further improving the user experience.

In the aforementioned step S102, the expression in the expression image needs to be adjusted by using the preset image processing model. In some embodiments of the present disclosure, the preset image processing model may be trained based on an expression image of a sample object and a video of a change of an expression of the sample object, wherein the sample object refers to an object capable of displaying a specific expression and a continuously changing expression corresponding to the specific expression.

In some embodiments of the present disclosure, the expression image of the sample object and the corresponding video of the change of the expression may be acquired by a sample collection method.

For example, in some embodiments, a video of a change of an expression of the sample object may be obtained first, and then an image of a certain frame with a specific expression in the video of the change of the expression is used as the expression image.

For another example, in some other embodiments, an expression image of an object may be first captured, and then prompt information may be output to prompt the object how to change the expression and acquire a captured video of the user when executing the expression change; and finally, the captured video is taken as an expression change video corresponding to the expression image.

In still other embodiments of the present disclosure, an expression image of the sample object may be determined first, and then a change process of the expression in a preset video is migrated to the expression image of the sample object by using a preset migration model, so as to obtain the video of the change of the expression of the sample object.

The preset video is a video with an expression change process; for example, it may be a video with a change in a smile degree, a video with a change in an eye opening or closing degree, or a video with both a change in the smile degree and a change in the eye opening or closing degree.

By adopting the migration model, the expression change process in the preset video is migrated to a plurality of sample objects to obtain videos of a change of an expression of the plurality of sample objects, so that each video of the change of the expression has a same expression change trend. For example, the smile degree or the eye opening or closing degree is gradually increased. An image processing model trained based on these video of the change of the expression and expression images can perform processing to obtain a video with this expression change trend.

The expression trend videos with the same expression change features corresponding to a plurality of expression images can be obtained by adopting the migration model based on the preset video and the expression images of the sample objects, which simplifies the difficulty of acquiring the videos of the change of the expression, and also improving the consistency of the trends of the expression change in the videos of the change of the expression for training the image processing model.

In some embodiments of the present disclosure, the migration model may be trained based on images of a plurality of facial regions and expression differences between the images of the plurality of facial regions, wherein the images of the plurality of facial regions are images of a same type of expression, and expression degrees of the same type of expression in different images are different. The images of the facial regions may be acquired based on facial key points on a preset facial image, wherein the face key points may comprise one or more of eye key points, mouth key points, eyebrow key points, or forehead key points.

Figure 6:
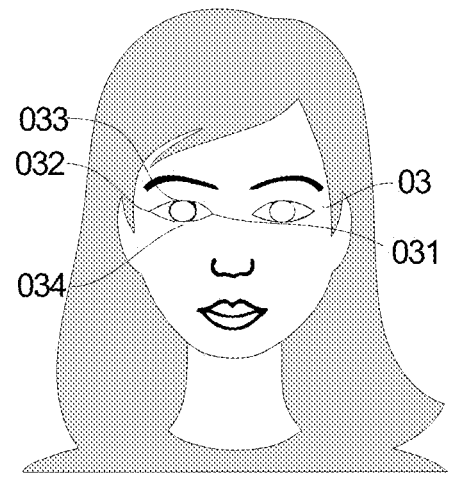
FIG. 6 is an image of a facial region provided by an embodiment of the present disclosure.
Figure 7:
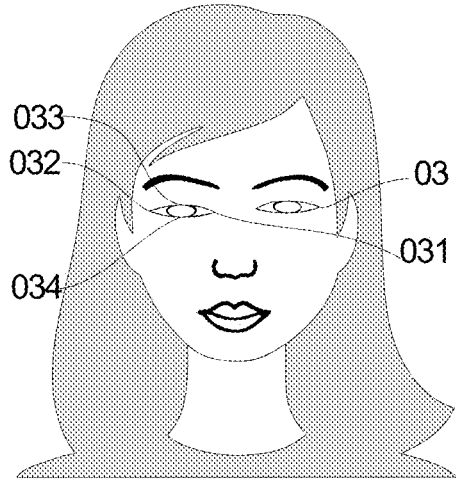
FIG. 7 is an image of a facial region provided by another embodiment of the present disclosure.
Figure 8:
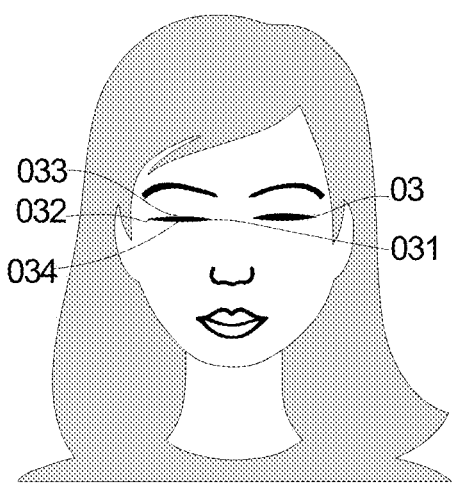
FIG. 8 is an image of a facial region provided by still another embodiment of the present disclosure.

FIG. 6 is an image of a facial region provided by an embodiment of the present disclosure; FIG. 7 is an image of a facial region provided by another embodiment of the present disclosure; FIG. 8 is an image of a facial region provided by still another embodiment of the present disclosure.

As shown in FIG. 6 to FIG. 8, in an embodiment of the present disclosure, the images of a plurality of facial regions are images different in the opening degree of eye 031 of object 03, and the expression differences between the images are the differences in the opening degrees of the eye 031.

If the migration model is trained by using FIG. 6 to FIG. 8, one image in FIG. 6 to FIG. 8 is used as an input image A, the other image is used as an output image B, and an eye opening difference between the input image A and the output image B is taken as an expression difference a-b. Parameters in a migration model F are optimized and trained, so as to obtain the migration model F for acquiring a video of a change of an expression.

In some embodiments of the present disclosure, the opening degrees of eye 030 in the facial region images of FIG. 6 to FIG. 8 may be manually labeled, and the model calculates the difference of the eye opening or closing degrees between the images according to labels. For example, if the eye opening degree is represented by a numerical value between 0.0 and 1.0, the opening degree of eye 03 corresponding to FIG. 6 may be labeled as 0.5, the opening degree of the eye 03 corresponding to FIG. 7 may be labeled as 0.2, the opening degree of the eye 03 corresponding to FIG. 8 may be labeled as 0.0, and the differences in the eye opening degrees between the three images may be calculated by the migration model based on the label information.

In some other embodiments of the present disclosure, the expression difference used to train the migration model may also be obtained by processing the images of the facial regions. For example, for the images of the facial regions shown in FIG. 6 to FIG. 8, key points of the eye 03 may be extracted, and expression feature parameters of the facial images may be determined based on the key points, and then the expression difference may be determined based on the expression feature parameters of the facial images.

Specifically, an eye region recognition model can be used to process FIG. 6 to FIG. 8 to obtain eye region images, and an edge recognition algorithm can be used to process the eye region images to identify an inner corner 031, an outer corner 032, an upper eyelid 033 pole and a lower eyelid 034 pole of the eye 03 as eye key points; then a transverse length of the eye is determined based on the inner corner 031 and the outer corner 032, and a longitudinal width of the eye 03 is determined based on the upper eyelid 033 pole and the lower eyelid 034 pole; and finally, the ratio of the longitudinal width to the transverse length of the eye is used as an expression feature parameter of the facial image, and the expression difference is determined based on the expression feature parameter of the facial image.

The foregoing embodiments of the present disclosure have been described by taking three input facial region images for training a migration model as an example. In other applications, the number of input facial region images for training a migration model may not be limited to three.

Figure 9:
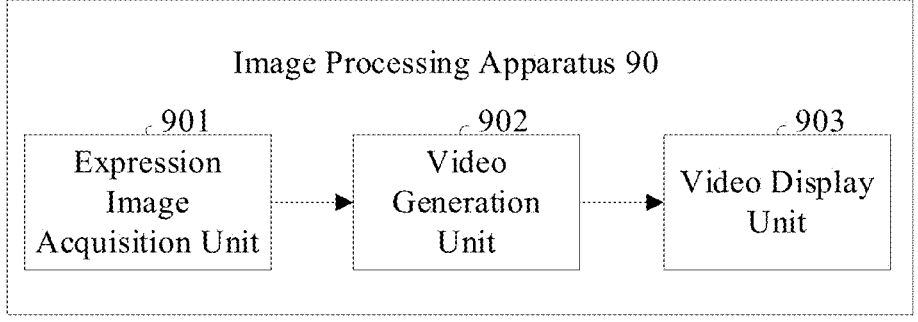
FIG. 9 is a schematic structural diagram of an image processing apparatus provided by an embodiment of the present disclosure.

FIG. 9 is a schematic structural diagram of an image processing apparatus provided by an embodiment of the present disclosure, where the processing apparatus may be understood as the terminal device or a part of functional modules in the terminal device. As shown in FIG. 9, an image processing apparatus 90 comprises an expression image acquisition unit 901, a video generation unit 902, and a video display unit 903.

The expression image acquisition unit 901 is used for acquiring an expression image; the video generation unit 902 is used for adjusting an expression in the expression image based on a preset image processing model to generate a video with a change process of the expression; the video display unit 903 is used for displaying the video.

In some embodiments of the present disclosure, the video generation unit 902 adjusts at least one of a smile degree or an eye opening or closing degree in the expression image based on the preset image processing model to generate a video with a change process of at least one of the smile degree or the eye opening or closing degree.

In some embodiments of the present disclosure, the image processing model is trained based on an expression image of a sample object and a video of a change of an expression of the sample object.

In still other embodiments of the present disclosure, the video of the change of the expression of the sample object is acquired by migrating a change process of the expression in a preset video to the expression image of the sample object by using a preset migration model.

In some embodiments of the present disclosure, the migration model is trained based on images of a plurality of facial regions and expression differences between the images of the plurality of facial regions, wherein the images of the plurality of facial regions are images of a same type of expression, and expression degrees of the same type of expression in different images are different.

In some embodiments of the present disclosure, the images of the facial regions are extracted based on facial key points on a preset facial image.

The apparatus provided by this embodiment is capable of performing the method of any of the above method embodiments, and the execution mode and the beneficial effects are similar, which are not described herein again.

The embodiment of the present disclosure further provides a terminal device, which comprises a processor and a memory, wherein the memory stores a computer program which, when executed by the processor, can implement the method of any one of the foregoing embodiments in FIG. 1 to FIG. 8.

Figure 10:
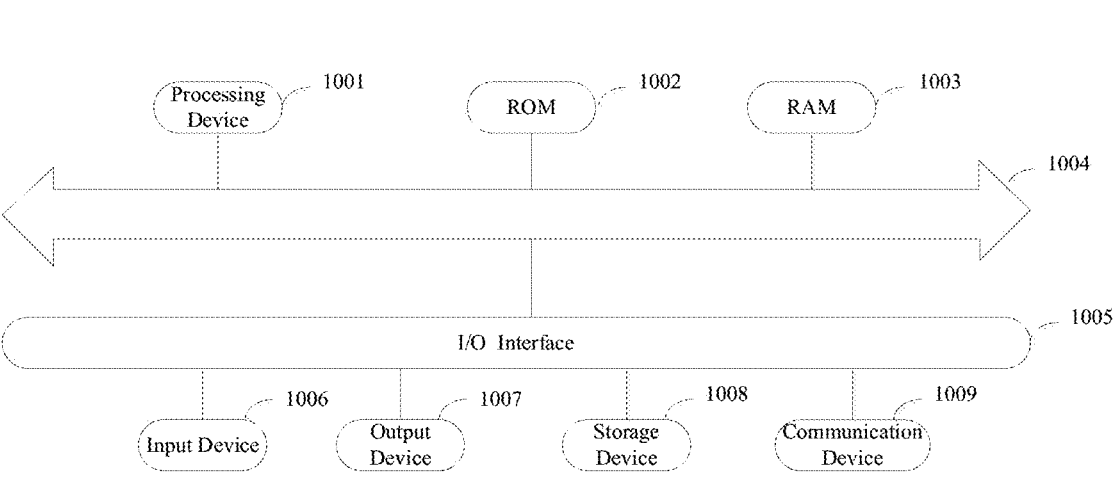
FIG. 10 is a schematic structural diagram of a terminal device provided by an embodiment of the present disclosure.

Illustratively, FIG. 10 is a schematic structural diagram of a terminal device provided by an embodiment of the present disclosure. Referring now specifically to FIG. 10, which shows a schematic structural diagram suitable for implementing a terminal device 1000 in an embodiment of the present disclosure. The terminal device 1000 in the embodiment of the present disclosure may comprise, but is not limited to, a mobile terminal such as a mobile phone, a notebook computer, a digital broadcast receiver, a PDA (personal digital assistant), a PAD (tablet), a PMP (portable multimedia player), a vehicle terminal (e.g., a car navigation terminal), and etc., and a fixed terminal such as a digital TV, a desktop computer, and etc. The terminal device shown in FIG. 10 is only an example, and should not bring any limitation to the functions and the scope of the application of the embodiment of the present disclosure.

As shown in FIG. 10, the terminal device 1000 may comprise a processing device (e.g., a central processer, a graphics processor, etc.) 1001 that may perform various appropriate actions and processes according to a program stored in a read-only memory (ROM) 1002 or a program loaded from a storage device 1008 into a random access memory (RAM) 1003. In the RAM 1003, various programs and data necessary for the operation of the terminal device 1000 are also stored. The processing device 1001, the ROM 1002, and the RAM 1003 are connected to each other via a bus 1004. An input/output (I/O) interface 1005 is also connected to the bus 1004.

Generally, the following devices can be connected to the I/O interface 1005: an input device 1006 comprising, for example, a touch screen, touch pad, keyboard, mouse, camera, microphone, accelerometer, gyroscope, etc.; an output device 1007 comprising, for example, a Liquid Crystal Display (LCD), speaker, vibrator, etc.; a storage device 1008 comprising, for example, magnetic tape, hard disk, etc.; and a communication device 1009. The communication device 1009 may allow the terminal device 1000 to communicate with other devices wirelessly or by wire to exchange data. While FIG. 10 illustrates a terminal device 1000 having various means, it is to be understood that it is not required to implement or provide all of the means shown. More or fewer means may be alternatively implemented or provided.

In particular, the processes described above with reference to the flow diagrams may be implemented as computer software programs, according to the embodiment of the present disclosure. For example, an embodiment of the present disclosure comprises a computer program product comprising a computer program carried on a non-transitory computer readable medium, the computer program containing program code for performing the method illustrated by the flow diagram. In such an embodiment, the computer program may be downloaded and installed from the network via the communication device 1009, or installed from the storage device 1008, or installed from the ROM 1002. When executed by the processing device 1001, the computer program performs the above-described functions defined in the method of the embodiments of the present disclosure.

It should be noted that the computer readable medium of the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that contains, or stores a program for use by or in combination with an instruction execution system, apparatus, or device. In contrast, in the present disclosure, a computer readable signal medium may comprise a data signal propagated in a baseband or as a part of a carrier wave, wherein a computer readable program code is carried therein. Such a propagated data signal may take a variety of forms, comprising, but not limited to, an electro-magnetic signal, an optical signal, or any suitable combination thereof. A computer-readable signal medium may be any computer readable medium other than a computer-readable storage medium and the computer-readable signal medium can communicate, propagate, or transport a program for use by or in combination with an instruction execution system, apparatus, or device. Program code embodied on a computer-readable medium may be transmitted using any appropriate medium, comprising but not limited to: electrical wires, optical cables, RF (radio frequency), etc., or any suitable combination thereof.

In some embodiments, the client and the server can communicate using any currently known or future-developed network protocol, such as HTTP (HyperText Transfer Protocol), and may be interconnected to digital data communication (e.g., a communication network) of any form or medium. Examples of communication networks comprise a local area network ("LAN"), a wide area network ("WAN"), the Internet (e.g., the Internet), and a peer-to-peer network (e.g., ad hoc peer-to-peer network), as well as any currently known or future developed network.

The computer readable medium may be comprised in the above-mentioned terminal device; or it may exist alone without being assembled into the terminal device.

The computer-readable medium carries one or more programs which, when executed by the terminal device, cause the terminal device to: acquiring an expression image; adjusting an expression in the expression image based on a preset image processing model to generate a video with a change process of the expression; and displaying the video.

Computer program code for carrying out operations of the present disclosure may be written in one or more programming languages or a combination thereof, the programming languages comprise, but are not limited to an object oriented programming language such as Java, Smalltalk, C++, and also comprise conventional procedural programming languages, such as the "C" programming language, or similar programming languages. The program code can be executed entirely on the user's computer, partly on the user's computer, as an independent software package, partly on the user's computer and partly executed on a remote computer, or entirely on the remote computer or server. In the scenario involving a remote computer, the remote computer may be connected to the user's computer through any type of network, comprising a Local Area Network (LAN) or a Wide Area Network (WAN), or may be connected to an external computer (for example, through the Internet using an Internet service provider).

The flow diagrams and block diagrams in the figures illustrate the architecture, functionality, and operation that are possibly implemented by systems, methods and computer program products according to various embodiments of the present disclosure. In this regard, each block in the flow diagrams or block diagrams may represent a module, program segment, or portion of code, which comprises one or more executable instructions for implementing the specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the block diagrams and/or flow diagrams, and a combination of blocks in the block diagrams and/or flow diagrams, can be implemented by special purpose hardware-based systems that perform the specified functions or operations, or combinations of special purpose hardware and computer instructions.

The units described in the embodiments of the present disclosure may be implemented by software or hardware. Wherein the name of a unit does not in some cases constitute a limitation on the unit itself.

The functions described herein above may be performed, at least in part by one or more hardware logic components. For example, without limitation, exemplary types of hardware logic components that may be used comprise Field Programmable Gate Arrays (FPGAs), Application Specific Integrated Circuits (ASICs), Application Specific Standard Products (ASSPs), Systems on a Chip (SOCs), Complex Programmable Logic Devices (CPLDs), and so forth.

In the context of this disclosure, a machine readable medium may be a tangible medium that can contain, or store a program for use by or in combination with an instruction execution system, apparatus, or device. The machine readable medium may be a machine readable signal medium or a machine readable storage medium. The machine readable medium may comprise, but is not limited to, an electronic, magnetic, optical, electromagnetic, infrared, or semiconductor system, apparatus, or device, or any suitable combination thereof. More specific examples of the machine readable storage medium would comprise an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The embodiment of the present disclosure further provides a computer-readable storage medium storing therein a computer program which, when executed by a processor, may implement the method of any one of the method embodiments, and the execution mode and beneficial effects are similar, which are not described herein again.

Finally, it is to be noted that terms used herein to describe relations such as "first" and "second" and the like are only used to distinguish one entity or operation from another entity or operation without necessarily requiring or implying any actual such relationship or order between such entities or actions. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors innate to the process, method, article or apparatus. Without more limitations, a factor defined with the sentence "comprising one . . . " does not exclude the case that the process, method, article or apparatus comprising said factor still comprises other identical factors.

The previous description is only for the purpose of describing particular embodiments of the present disclosure, so as to enable those skilled in the art to understand or implement the present disclosure. Plurality of amendments to these embodiments are obvious for those skilled in the art. The general principle defined in this text can be realized in other embodiments without deviating from the spirit or scope of the present disclosure. Therefore, the present disclosure will not be limited to these embodiments as shown herein, but is to conform to the broadest scope that is consistent with the principle and novel features as disclosed herein.

What is claimed is:

1. An image processing method, comprising:
acquiring an expression image;
adjusting an expression in the expression image based on a preset image processing model to generate a video with a change process of the expression; and
displaying the video,
wherein the image processing model is trained based on expression images of multiple sample objects and multiple videos of changes of expressions of the sample objects, and each of the videos of the changes of the expressions of the sample objects is acquired by migrating a change process of an expression in a preset video to the expression image of the sample object by using a preset migration model and the multiple videos have same expression change features.

2. The image processing method according to claim 1, wherein the adjusting an expression in the expression image based on a preset image processing model to generate a video with a change process of the expression comprises:
adjusting at least one of a smile degree or an eye opening or closing degree in the expression image based on the preset image processing model to generate a video with a change process of at least one of the smile degree or the eye opening or closing degree.

3. The image processing method according to claim 1, wherein the migration model is trained based on images of a plurality of facial regions and expression differences between the images of the plurality of facial regions, wherein the images of the plurality of facial regions are images of a same type of expression, and expression degrees of the same type of expression in different images are different.

4. The image processing method according to claim 3, wherein the images of the plurality of facial regions are extracted based on key points of face in a preset facial image.

5. A terminal device, comprising:
a memory; and
a processor coupled to the memory, the processor configured to perform an image processing method comprising:
acquiring an expression image;
adjusting an expression in the expression image based on a preset image processing model to generate a video with a change process of the expression; and
displaying the video,
wherein the image processing model is trained based on expression images of multiple sample objects and multiple videos of changes of expressions of the sample objects, and each of the videos of the changes of the expressions of the sample objects is acquired by migrating a change process of an expression in a preset video to the expression image of the sample object by using a preset migration model and the multiple videos have same expression change features.

6. The terminal device according to claim 5, wherein the processor is further configured to:
adjust at least one of a smile degree or an eye opening or closing degree in the expression image based on the preset image processing model to generate a video with a change process of at least one of the smile degree or the eye opening or closing degree.

7. The terminal device according to claim 5, wherein the migration model is trained based on images of a plurality of facial regions and expression differences between the images of the plurality of facial regions, wherein the images of the plurality of facial regions are images of a same type of expression, and expression degrees of the same type of expression in different images are different.

8. The terminal device according to claim 7, wherein the images of the plurality of facial regions are extracted based on key points of face in a preset facial image.

9. A non-transitory computer-readable storage medium, wherein the storage medium has stored therein a computer program which, when executed by a processor, implements an image processing method comprising:

acquiring an expression image;

adjusting an expression in the expression image based on a preset image processing model to generate a video with a change process of the expression; and displaying the video, wherein the image processing model is trained based on expression images of multiple sample objects and multiple videos of changes of expressions of the sample objects, and each of the videos of the changes of the expressions of the sample objects is acquired by migrating a change process of an expression in a preset video to the expression image of the sample object by using a preset migration model and the multiple videos have same expression change features.

10. The non-transitory computer-readable storage medium according to claim 9, wherein the image processing method further comprises:

adjusting at least one of a smile degree or an eye opening or closing degree in the expression image based on the preset image processing model to generate a video with a change process of at least one of the smile degree or the eye opening or closing degree.

11. The non-transitory computer-readable storage medium according to claim 9, wherein the migration model is trained based on images of a plurality of facial regions and expression differences between the images of the plurality of facial regions, wherein the images of the plurality of facial regions are images of a same type of expression, and expression degrees of the same type of expression in different images are different.

12. The non-transitory computer-readable storage medium according to claim 11, wherein the images of the plurality of facial regions are extracted based on key points of face in a preset facial image.

\* \* \* \* \*